United States Patent
Namiki

(10) Patent No.: US 10,891,520 B2
(45) Date of Patent: Jan. 12, 2021

(54) MACHINE LEARNING DEVICE, INSPECTION DEVICE AND MACHINE LEARNING METHOD

(71) Applicant: FANUC CORPORATION, Yamanashi (JP)

(72) Inventor: Yuta Namiki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 149 days.

(21) Appl. No.: 16/029,827

(22) Filed: Jul. 9, 2018

(65) Prior Publication Data
US 2019/0012579 A1    Jan. 10, 2019

(30) Foreign Application Priority Data
Jul. 10, 2017    (JP) ................ 2017-134508

(51) Int. Cl.
*G06K 9/62* (2006.01)
*G06K 9/20* (2006.01)
(Continued)

(52) U.S. Cl.
CPC ......... *G06K 9/6262* (2013.01); *G06K 9/2018* (2013.01); *G06K 9/4628* (2013.01);
(Continued)

(58) Field of Classification Search
CPC .. G06K 9/6262; G06K 9/4628; G06K 9/6274; G06K 9/2018; G06K 2209/19;
(Continued)

(56) References Cited

U.S. PATENT DOCUMENTS

2001/0042705 A1* 11/2001 Nakagaki ........... G01N 21/9501
209/44.4
2002/0051565 A1* 5/2002 Hiroi ................ G01N 21/95607
382/149
(Continued)

FOREIGN PATENT DOCUMENTS

JP    02-074848    3/1990
JP    5-196444     8/1993
(Continued)

OTHER PUBLICATIONS

Notification of Reasons for Refusal dated Jun. 11, 2019 in Japanese Patent Application No. 2017-134508.
(Continued)

*Primary Examiner* — Ming Y Hon
(74) *Attorney, Agent, or Firm* — Wenderoth, Lind & Ponack, L.L.P.

(57) ABSTRACT

A machine learning device that creates training data to be used in machine learning includes: an image input unit that inputs an image which was obtained by capturing an inspection target on which a symbol indicating a defect is marked; and a creation unit that creates the training data based on the inputted image, in which the creation unit: creates training data consisting of a training image which is the image as inputted, and a label that retains a value of OK which signifies not having a defect, in a case of there not being the symbol in the image inputted; and creates training data consisting of a training image generated based on the image inputted, and a label that retains a value of NG signifying having a defect, in a case of there being the symbol in the image inputted.

14 Claims, 12 Drawing Sheets

(51) Int. Cl.
*G06K 9/46* (2006.01)
*G06T 7/00* (2017.01)

(52) U.S. Cl.
CPC .......... *G06K 9/6274* (2013.01); *G06T 7/0002* (2013.01); *G06K 2209/19* (2013.01); *G06T 2207/20081* (2013.01); *G06T 2207/30164* (2013.01)

(58) Field of Classification Search
CPC ......... G06T 7/0002; G06T 2207/20081; G06T 2207/30164; G01N 21/8803
See application file for complete search history.

(56) References Cited

U.S. PATENT DOCUMENTS

| | | | | |
|---|---|---|---|---|
| 2003/0202703 | A1* | 10/2003 | Ogi | G06T 7/0004 382/224 |
| 2004/0089812 | A1* | 5/2004 | Favro | G01N 3/60 250/341.6 |
| 2005/0236569 | A1* | 10/2005 | Yamaguchi | H01J 37/265 250/311 |
| 2006/0215902 | A1* | 9/2006 | Shibuya | G01N 21/95607 382/149 |
| 2006/0289766 | A1* | 12/2006 | DiMarzio | G01N 21/8422 250/341.8 |
| 2008/0285840 | A1* | 11/2008 | Kawai | G01N 21/8851 382/141 |
| 2008/0297780 | A1* | 12/2008 | Clasen | G01N 21/8803 356/237.2 |
| 2009/0080759 | A1* | 3/2009 | Bhaskar | G06T 7/001 382/141 |
| 2010/0052250 | A1* | 3/2010 | Iijima | B41J 11/0005 271/265.01 |
| 2010/0128119 | A1* | 5/2010 | Takahashi | G06T 7/001 348/126 |
| 2010/0150308 | A1* | 6/2010 | Tsuno | A01K 43/08 378/54 |
| 2012/0141011 | A1* | 6/2012 | Sakai | G06T 7/001 382/149 |
| 2014/0002675 | A1* | 1/2014 | Duparre | H04N 17/002 348/187 |
| 2015/0278575 | A1* | 10/2015 | Allano | G06K 9/00127 382/133 |
| 2015/0310448 | A1* | 10/2015 | Vilain | G06Q 30/016 705/51 |
| 2016/0177481 | A1* | 6/2016 | Wolf | D03D 51/00 700/140 |
| 2017/0047195 | A1* | 2/2017 | Lee | H01J 37/222 |
| 2017/0069075 | A1* | 3/2017 | Okuda | G06K 9/6284 |
| 2017/0212829 | A1* | 7/2017 | Bales | G06F 11/3664 |
| 2017/0323435 | A1* | 11/2017 | Minekawa | G06T 7/001 |
| 2018/0129899 | A1* | 5/2018 | Harron | G06N 3/0445 |
| 2018/0322623 | A1* | 11/2018 | Memo | G06N 3/084 |

FOREIGN PATENT DOCUMENTS

| | | |
|---|---|---|
| JP | 06-148097 | 5/1994 |
| JP | 11-153551 | 6/1999 |
| JP | 2002-508071 | 3/2002 |
| JP | 2003-530680 | 10/2003 |
| JP | 2009-14357 | 1/2009 |
| JP | 2010-266202 | 11/2010 |
| JP | 2014-032122 | 2/2014 |
| JP | 2017-102865 | 6/2017 |

OTHER PUBLICATIONS

Notification of Reasons for Refusal dated Feb. 5, 2019 in corresponding Japanese Patent Application No. 2017-134508.

* cited by examiner

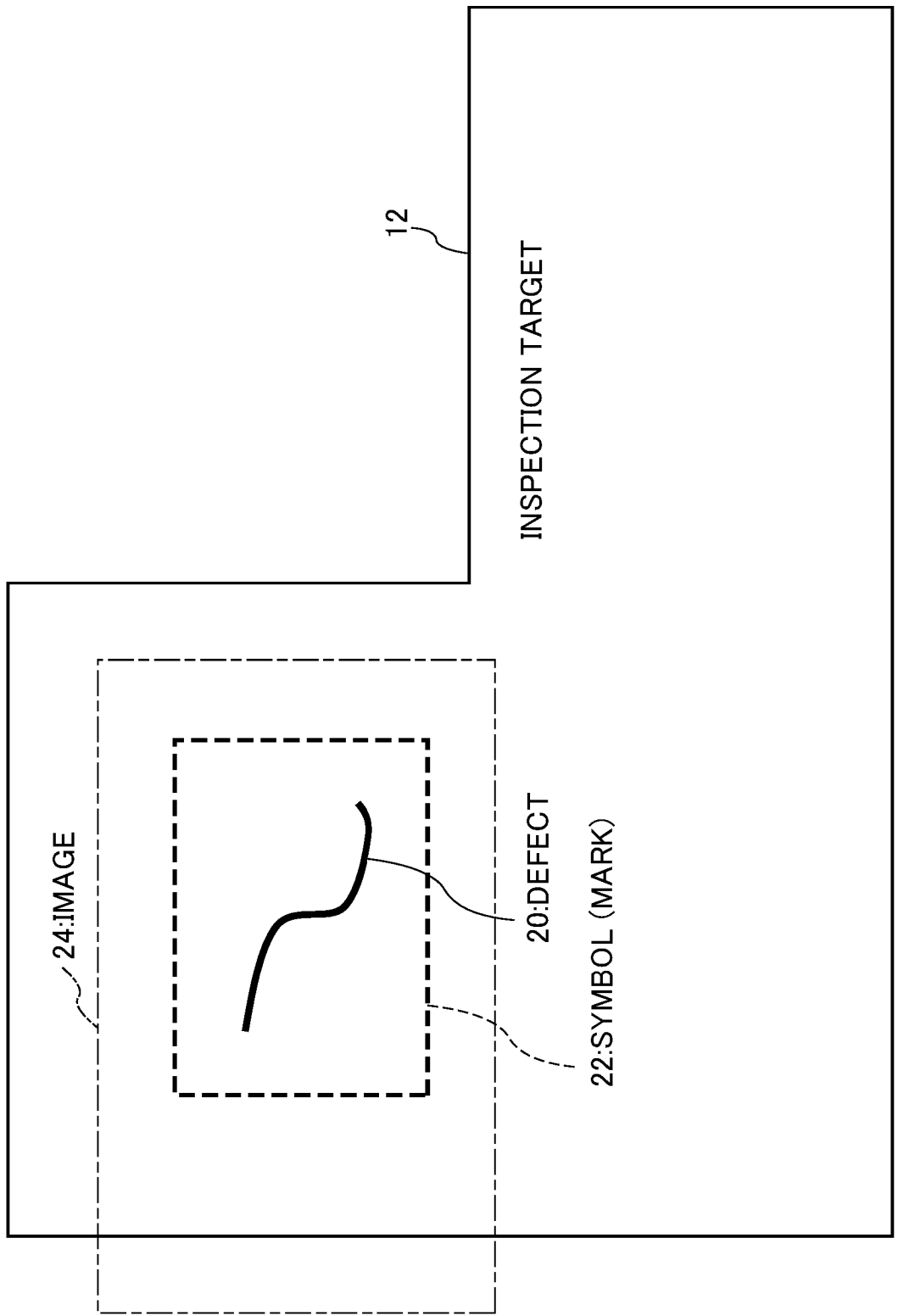

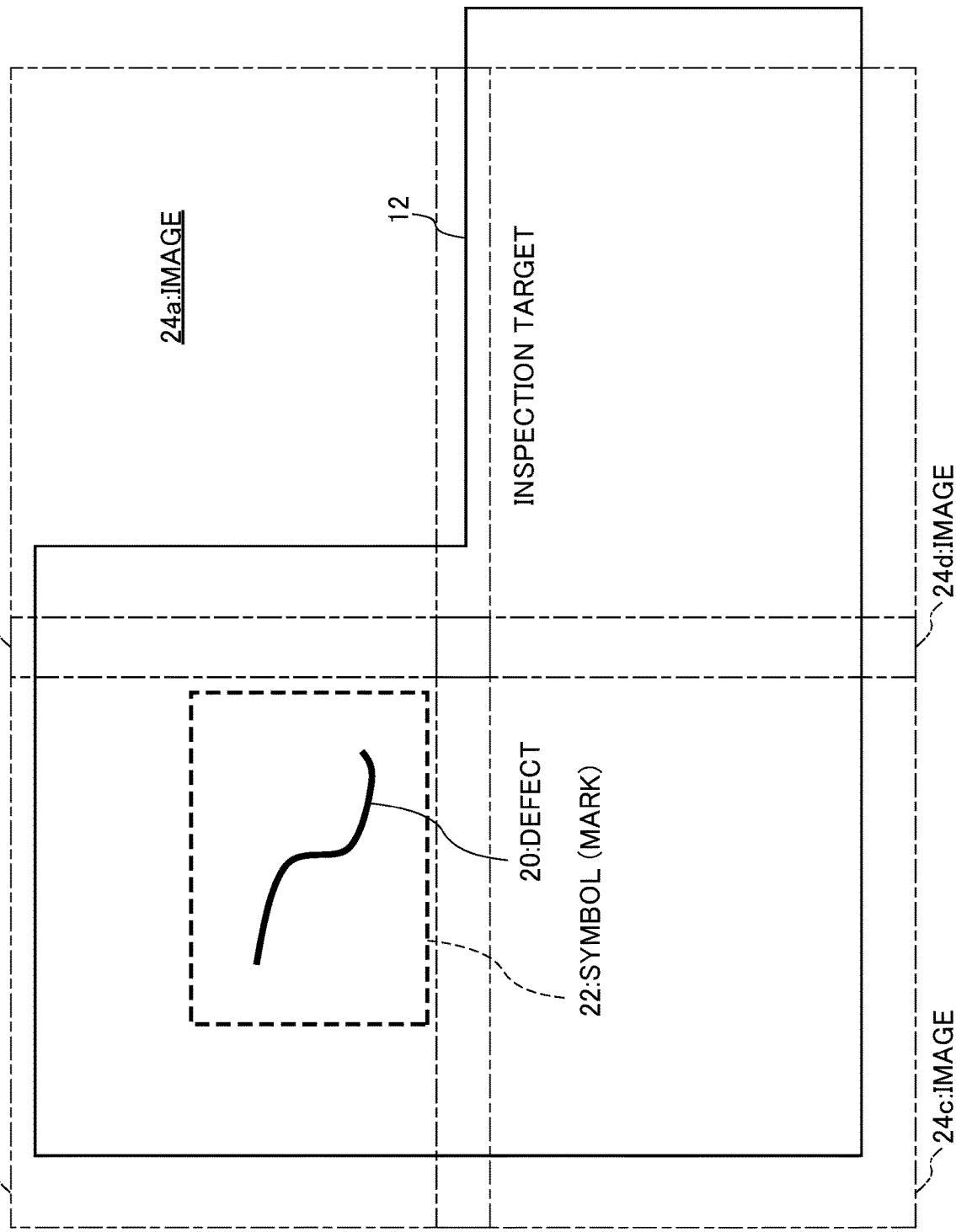

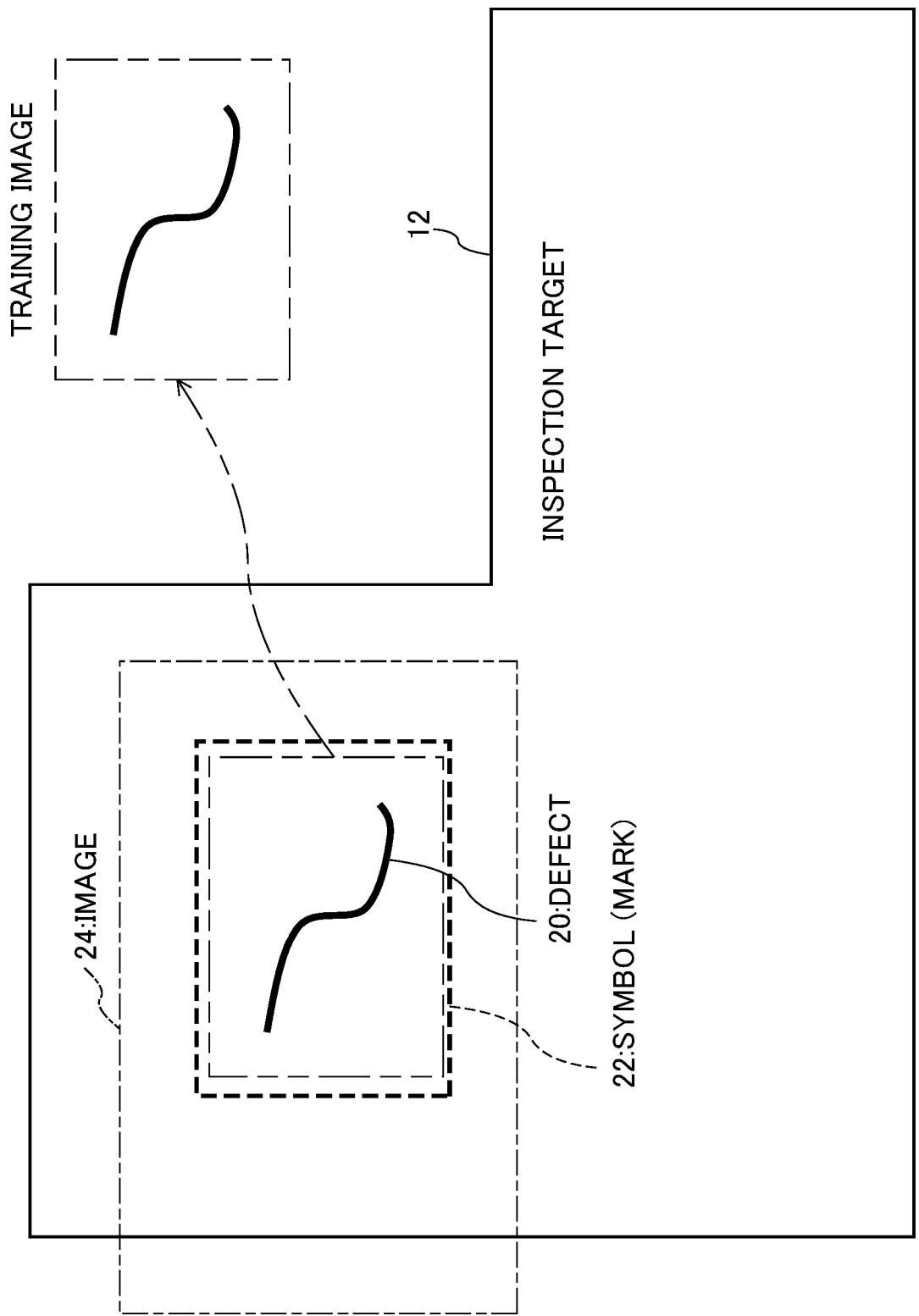

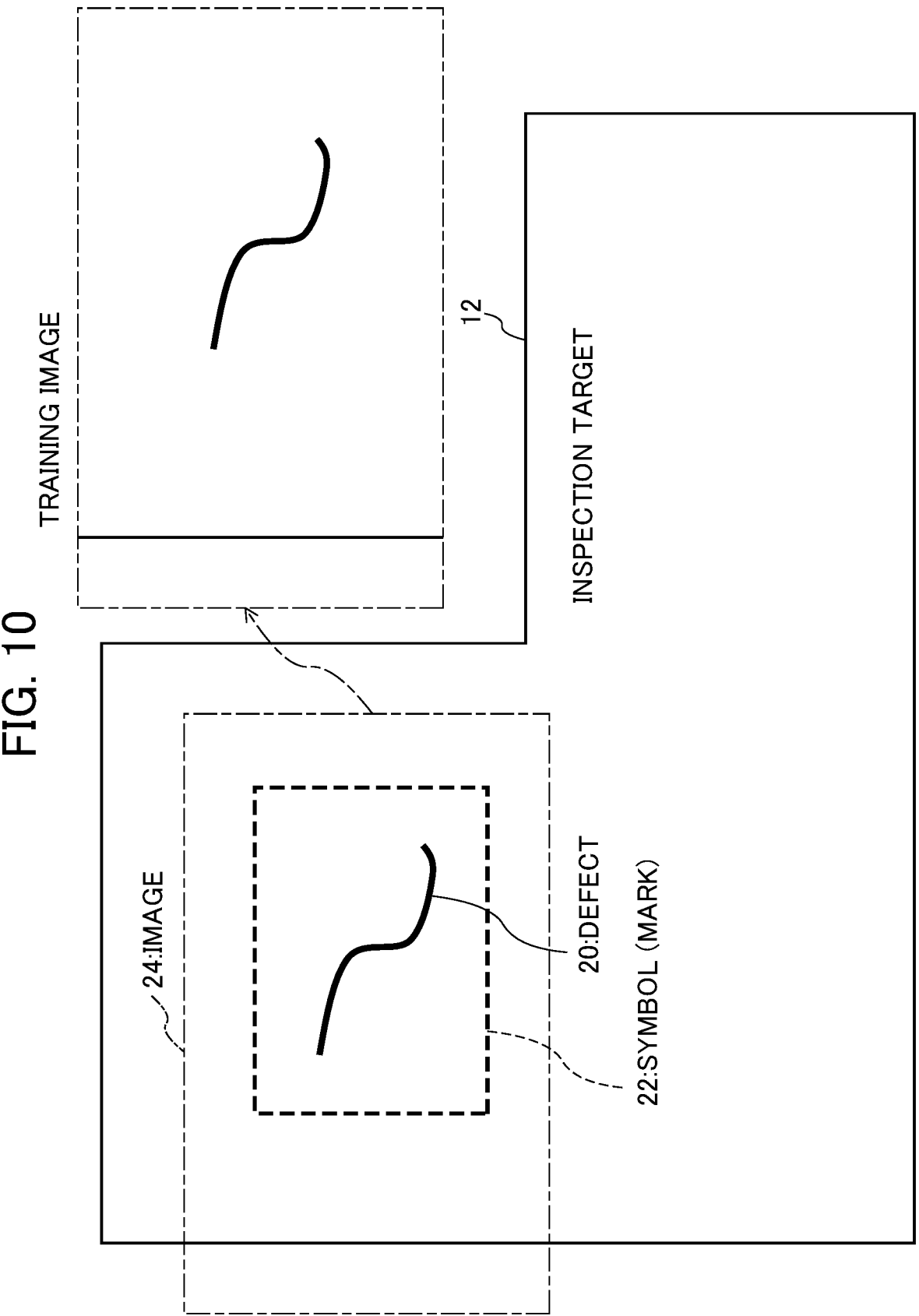

CAPTURE WITH VISUAL LIGHT

CAPTURE WITH UV LIGHT

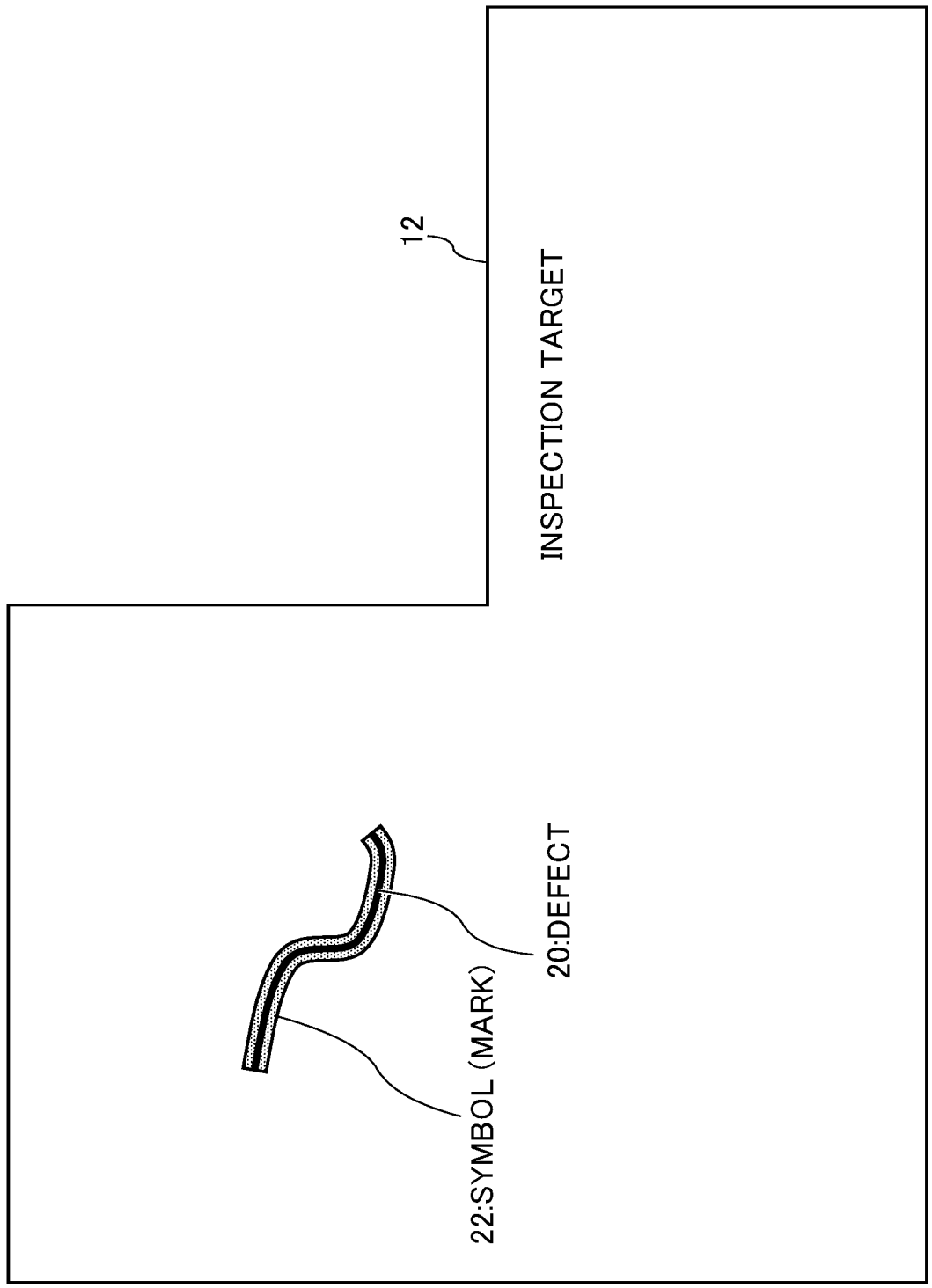

TRAINING IMAGE

MASK IMAGE

MACHINE LEARNING DEVICE, INSPECTION DEVICE AND MACHINE LEARNING METHOD

BACKGROUND OF THE INVENTION

Field of the Invention

The present invention relates to a machine learning device and a machine learning method. In particular, it relates to a machine learning device and machine learning method which can efficiently generate training data for machine learning. In addition, it relates to an inspection device made using this machine learning device and machine learning method.

Related Art

Conventionally, a system has been known that acquires an image of an inspection target by a visual sensor, and performs inspection through image processing on the acquired image. In the case of performing inspection of an inspection target with image processing, there is a method which uses a technique of machine learning to perform distinguishing between OK (good product) or NG (so-called inferior product in which any defect was found).

In order to perform this machine learning, training data is required which consists of an image of the inspection target, and a label designating that the inspection target captured in this image is OK or NG. If preparing several groups of sets of training data of the image of the inspection target and the label having the value of "OK" or "NG" in this way, it is possible to perform machine learning using groups of these training data sets. Subsequently, based on the contents produced by machine learning, it is made possible for the machine learning device (having performed machine learning) to distinguish between OK and NG on new input images of the inspection target.

Prior to performing machine learning, the determination of OK or NG is often performed by a person, and the determination result thereof is used as the aforementioned training data. In addition, since the machine learning device may make a misjudgment even after having done machine learning, it is necessary for correction thereof to be performed by a person.

In such a case, it is necessary to provide the determination or correction performed by a person to a device or the like for performing machine learning. As one method for provision, it has been considered for people to perform labeling of OK or NG, on an image of the inspection target obtained by the visual sensor. As a result thereof, the group of the image of the inspection target and the label having a value of "OK" or "NG" is easily obtained. Patent Documents 1 and 2 can be given as documents related to this type of technology.

Patent Document 1 discloses technology of performing learning for a position at which to perform capturing of an inspection surface in a surface inspection device of the inspected object. This learning is the matter of performing association between the capturing sequence and the capturing position. In other words, Patent Document 1 does not show machine learning.

Patent Document 2 discloses technology for an inspector to inspect visually the coating of a vehicle body, and attach markings to defect locations. The place at which a marking is attached is detected at a downstream step, and polishing is performed with this as the defect site. In this Patent Document 2, corrective processing is performed on the places to which marks are attached.

Patent Document 1: Japanese Unexamined Patent Application, Publication No. 2009-14357
Patent Document 2: Japanese Unexamined Patent Application, Publication No. H05-196444

SUMMARY OF THE INVENTION

However, in the case of a person making the judgment of OK or NG, it is often judged as OK or NG by viewing the actual inspection target (actual workpiece). After a person actually views the inspection target in this way, further viewing an image and performing labeling of OK or NG is considered cumbersome work. Herein, the following two cases have been considered, for example. (A) In an image in which the target is captured, a person designates the place of a defect while viewing this image. (B) Each site of the target is divided and a plurality of images are acquired, a person then looks for images in which a defect is captured from among this plurality of images, and attaches a label of NG to this image.

In the case of (A), first, after a person finds a defect on an actual inspection target, the person again looks for the location corresponding to the defect portion from the images obtained by a visual sensor, and assigns the NG label along with designating the defect site on this image. However, twice the labor of the work to find a defect site on the actual inspection target, and the work searching for the defect site on the image becomes necessary, and tends to be cumbersome work.

In the case of (B), first after a person finds a defect on the actual inspection target, the person looks for an image corresponding to this defect site from among the plurality of images, and assigns the NG label to this image. Therefore, twice the labor of the work to find a defect site on the actual inspection target, and the work searching for an image including this defect site becomes necessary, and tends to be cumbersome work. In addition, in the case of there being a great number of images, the workload increases in proportion to this.

Although it would be good if able to use this defect found by a person viewing the inspection target as is and using in the training data for machine learning, the current situation is that such technology is still not known.

The present invention has an object of providing a machine learning device and machine learning method which can more efficiently create training data for machine learning.

In order to achieve the above-mentioned object, the present inventors have thoroughly investigated the following such principles. First, an inspector marks a specific symbol on a defect portion of the actual inspection target. By a similar method to the case of inspecting using the above-mentioned conventional image processing, an image is captured, and an image of the inspection target on which the above-mentioned symbol was marked is obtained. The specific symbol is found from the acquired image, and the portion on which the symbol is marked is recorded as a defect. In the case of recording as a defect, it is also possible to give a label of NG to this image and record.

According to such a principle, it is possible to acquire training data that can be applied to machine learning. Herein, the training data is data that at least includes an image for machine learning (referred to as "training image"), and a label which retains a value of NG or OK. In this case, the symbol marked on the inspection target may be removed from the image for machine learning.

In addition, the present inventors have analyzed the following such processing, for example, for the mechanism of symbol removal. As removal method 1, a symbol made using a specific shape or specific color is employed as the symbol marking the inspection target. In this case, if there is a symbol of a specific shape or specific color in the image, by taking this out by image processing, it is possible to use this image as the training image. In addition, if there is a symbol of a specific shape or color in the image, it is possible to configure so as not to use this portion in machine learning.

In addition, as removal method 2, a symbol is marked on the inspection target using fluorescent paint. For example, it is possible to use fluorescent paint such that is colorless and transparent under visible light, but fluoresces under UV light. It is possible for the inspector to obtain an image for inspection/learning after having marked the symbol on the inspection target using such fluorescent paint, by way of capturing under visible light illumination such that the symbol is not captured in the image. In addition, an image for detection of defects can be acquired by capturing under UV light illumination, so that the symbol is captured in the image.

Specifically, the present invention adopts the following such configuration. A first aspect of the present invention relates to a machine learning device (for example, the machine learning device 40 described later) for creating training data to be used in machine learning, the machine learning device including: an image input unit (for example, the image input unit 42 described later) that inputs an image which was obtained by capturing an inspection target (for example, the inspection target 12 described later) on which a symbol indicating a defect is marked; and a creation unit (for example, the creation unit 44 described later) that creates the training data based on the inputted image, in which the creation unit: creates training data consisting of a training image which is the image as inputted, and a label that retains a value of OK which signifies not having a defect, in a case of there not being the symbol in the image inputted; and creates training data consisting of a training image generated based on the image inputted, and a label that retains a value of NG signifying having a defect, in a case of there being the symbol in the image inputted.

According to a second aspect of the present invention, in the machine learning device as described in the first aspect, the creation unit may create training data consisting of a training image generated based on the image inputted, a position of a defect indicated by the symbol, and a label retaining the value of NG, in a case of there being the symbol in the image inputted.

According to a third aspect of the present invention, in the machine learning device as described in the first aspect, the symbol indicating the defect may be a different symbol depending on a type of the defect, the creation unit may create training data consisting of a training image generated based on the image inputted, a type of defect indicated by the symbol, and a label retaining the value of NG, in a case of there being the symbol in the image inputted.

According to a fourth aspect of the present invention, in the machine learning device as described in the third aspect, a scratch, stain and chip of the inspection target may be included as types of the defect.

According to a fifth aspect of the present invention, in the machine learning device as described in the third aspect, the different symbol may be a symbol having a different reflective optical wavelength from another symbol.

According to a sixth aspect of the present invention, in the machine learning device as described in the first aspect, the creation unit: may generate a training image by removing the symbol from an image generated based on the image inputted, in a case of there being the symbol in the image inputted, and may create training data consisting of the training image thus generated, and a label retaining the value of NG.

According to a seventh aspect of the present invention, in the machine learning device as described in the sixth aspect, the creation unit may generate a training image by cutting out only inside of a region indicated by the symbol from the image inputted, in a case of there being the symbol in the image inputted.

According to an eighth aspect of the present invention, in the machine learning device as described in the sixth aspect, the creation unit may generate a training image by replacing pixels constituting the symbol from the image inputted with peripheral pixels of the symbol, in a case of there being the symbol in the image inputted.

According to a ninth aspect of the present invention, in the machine learning device as described in the first aspect, the creation unit may create training data consisting of a training image generated based on the image inputted, a label retaining a value of NG signifying having a defect, and a mask image that masks the symbol, in a case of there being the symbol in the image inputted.

According to a tenth aspect of the present invention, in the machine learning device as described in the ninth aspect, the mask image may be an image setting pixels constituting the symbol as 1, and setting pixels other than the symbol as 0.

According to an eleventh aspect of the present invention, in the machine learning device as described in the first aspect, the image input unit may input a marking image obtained by capturing an inspection target on which a symbol indicating a defect is marked in a state illuminating with light of a wavelength whereby the symbol is visible, and a training image obtained by capturing in a state illuminating with light of a wavelength whereby the symbol is not visible, and the creation unit may create training data consisting of information of a defect acquired from the marking image, and the training image.

According to a twelfth aspect of the present invention, an inspection device includes: the machine learning device as described in any one of the first to eleventh aspects; and a storage unit that stores training data created by the machine learning device, in which the machine learning device may include a learning unit which learned from training data stored by the storage unit, and outputs a determination result of a defect based on an image of the inspection target inputted by the image input unit.

According to a thirteenth aspect of the present invention, an inspection device includes: the machine learning device as described in the eleventh aspect; and a storage unit that stores training data created by the machine learning device, in which the image input unit may input an image obtained by capturing in a state illuminating with light of a wavelength whereby the symbol indicating a defect is not visible, and the machine learning device may include a learning unit which learned from training data stored by the storage unit, and outputs a determination result of a defect based on an image of the inspection target inputted by the image input unit.

A fourteenth aspect of the present invention relates to a machine learning method for creating training data to be used in machine learning, the method including the steps of: inputting an image obtained by capturing an inspection target on which a symbol indicating a defect is marked; and creating the training data based on the image inputted, in which the step of creating the training data includes: a step of creating training data consisting of a training image which is the image as inputted, and a label that retains a value of OK signifying not having a defect, in a case of there not being the symbol in the image inputted; and a step of creating training data consisting of a training image generated based on the image inputted, and a label that retains a value of NG signifying having a defect, in a case of there being the symbol in the image inputted.

According to the present invention, it is possible to provide a machine learning device and machine learning method which can create training data based a marked image.

Therefore, it is possible to more efficiently conduct the creation of training data.

BRIEF DESCRIPTION OF THE DRAWINGS

FIG. 7 is an explanatory drawing of a captured image 24;

FIG. 8 is an explanatory drawing showing an aspect for a case of capturing a plurality of images;

FIG. 9 is an explanatory drawing for a case of making a training image by cutting out only the inside of a symbol 22;

FIG. 10 is an explanatory drawing for a case of making an image arrived at by replacing pixels of a portion of the symbol 22 using information of peripheral pixels as a training image;

FIG. 12 is an explanatory drawing showing an aspect of the symbol 22 being marked to superimpose with the defect 20;

DETAILED DESCRIPTION OF THE INVENTION

Hereinafter, embodiments of the present invention will be explained while referencing the drawings.

(Inspection Device)

Figure 1:
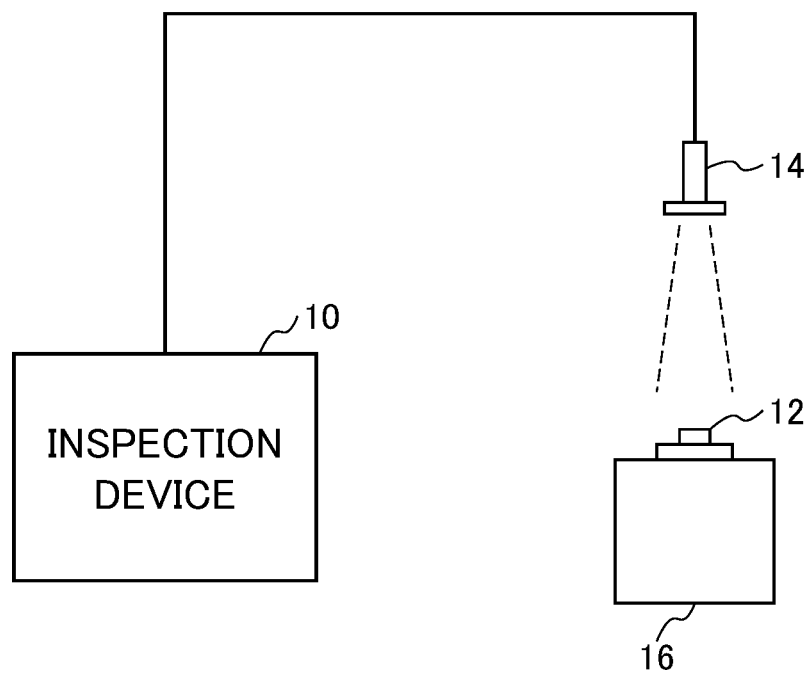
FIG. 1 is an explanatory drawing showing an aspect of inspecting an inspection target 12 using an inspection device 10 according to an embodiment of the present invention.

FIG. 1 is an explanatory drawing showing an aspect of inspecting an inspection target 12 using an inspection device 10 for inspecting an inspection target. As shown in the same drawing, a visual sensor 14 that captures the inspection target 12 is connected to the inspection device 10. The visual sensor 14 captures the inspection target 12, and supplies this image to the inspection device 10. In addition, the inspection target 12 is placed on a work bench 16 for performing machining, etc. The inspection device 10 inspects whether there is a defect in the inspection target 12 based on the image supplied from the visual sensor 14, and outputs the results thereof to outside. The visual sensor 14 may be any kind of device so long as being a camera that can capture the inspection target 12.

The inspection device 10 is a device that determines the presence/absence of defects in the inspection target 12 based on the image. In order to realize such a function, the inspection device 10 performs so-called machine learning, and determines on the image whether there is a defect in the inspection target 12 of this image based on this learning result.

Figure 2:
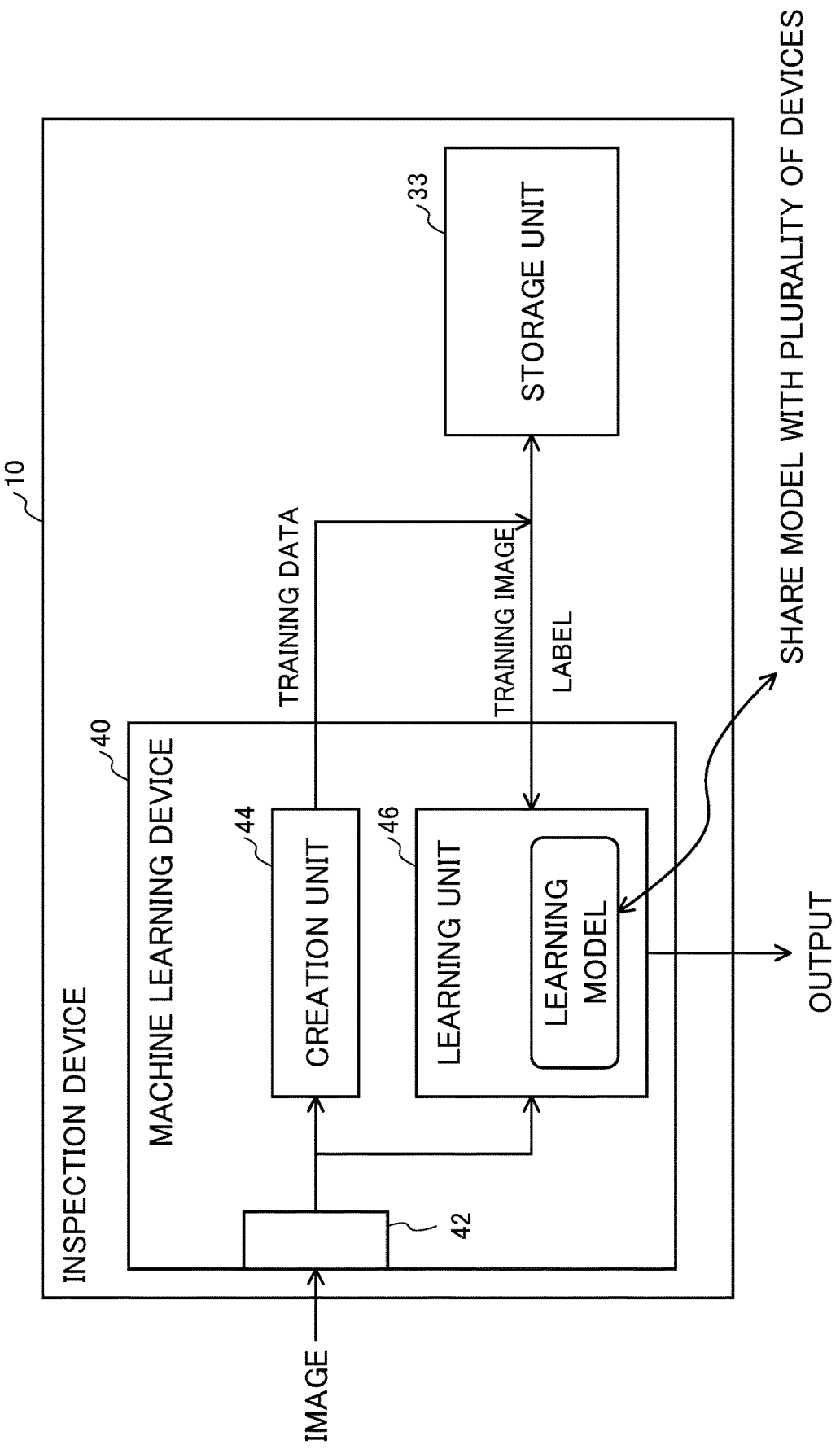
FIG. 2 is a block diagram of the inspection device 10 according to an embodiment of the present invention.

For example, the inspection device 10 may use a configuration such as FIG. 2. As shown in FIG. 2, the machine learning device 40 within the inspection device 10 can acquire a learning model by performing machine learning so as to output a determination result for appropriately distinguishing between OK, NG from the image data (training image) and label (OK or NG) inputted based on the training data group stored in a storage unit 33. The training data is configured from at least a training image and a label representing the presence/absence of a defect, in the present embodiment. Based on these training data, a learning unit 46 performs learning, and creates a learning model.

It is possible to estimate the determination results in response to image data inputted from the image input unit 42, by causing the relationship between the input and output to be learned in the learning unit 46 of the machine learning device 40, so that the output retrieved from the learning unit 46 matches the determination result that is the target of estimation. In the present embodiment, machine learning is performed (in the learning unit 46) following a learning model constructed by a neural network including a multilayered neural network, for example. The learning model constructed by a neural network including an input layer, output layer and intermediate layer can use an appropriate system. For example, CNN (Convolutional Neural Network) can also be applied.

After learning, the learning unit 46 performs a predetermined determination based on the learning model for an image inputted by the image input unit 42, and outputs a determination result. In the present embodiment, the determination result may be OK (no defect) or NG (has defect), for example. The training data is a collection of pairs (groups) of a training image and a label to be obtained from this training image; however, it may include other information.

This training data is stored in the storage unit 33, and the learning unit 46 learns using this. Although it is sufficient if preparing several sets of training data and learning by the learning unit 46 of the machine learning device 40, creating training data requires many complex operations, and has a great burden on people, as mentioned above. Therefore, the present embodiment proposes an efficient creation method for training data. In order to realize this creation method, the machine learning device 40 of the present embodiment includes a creation unit 44 that creates training data based on marked images. This creation unit 44 creates training data based on the marked images inputted from the image input unit 42, and stores in the storage unit 33. Subsequently, the learning unit 46 can perform learning based on the training data stored in the storage unit 33.

(Creation of Training Data)

Figure 3:
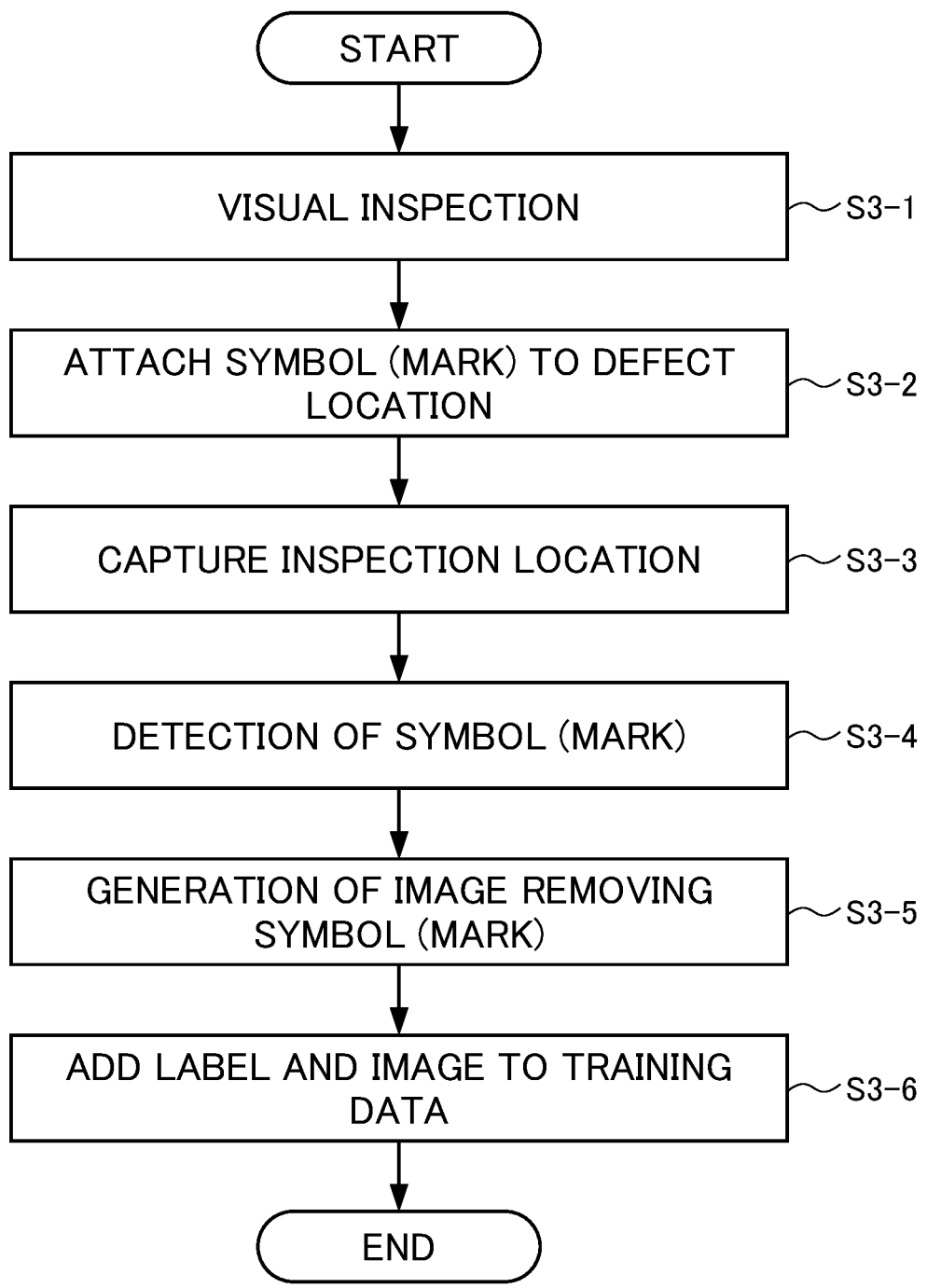
FIG. 3 is a flowchart representing a sequence adding a pair of a new training image and a label to training data in an embodiment of the present invention.

FIG. 3 shows a flowchart representing a sequence of adding a pair of a new training image and a label to training data. In Step S3-1, an inspector performs visual inspection of the inspection target 12.

Figure 4:
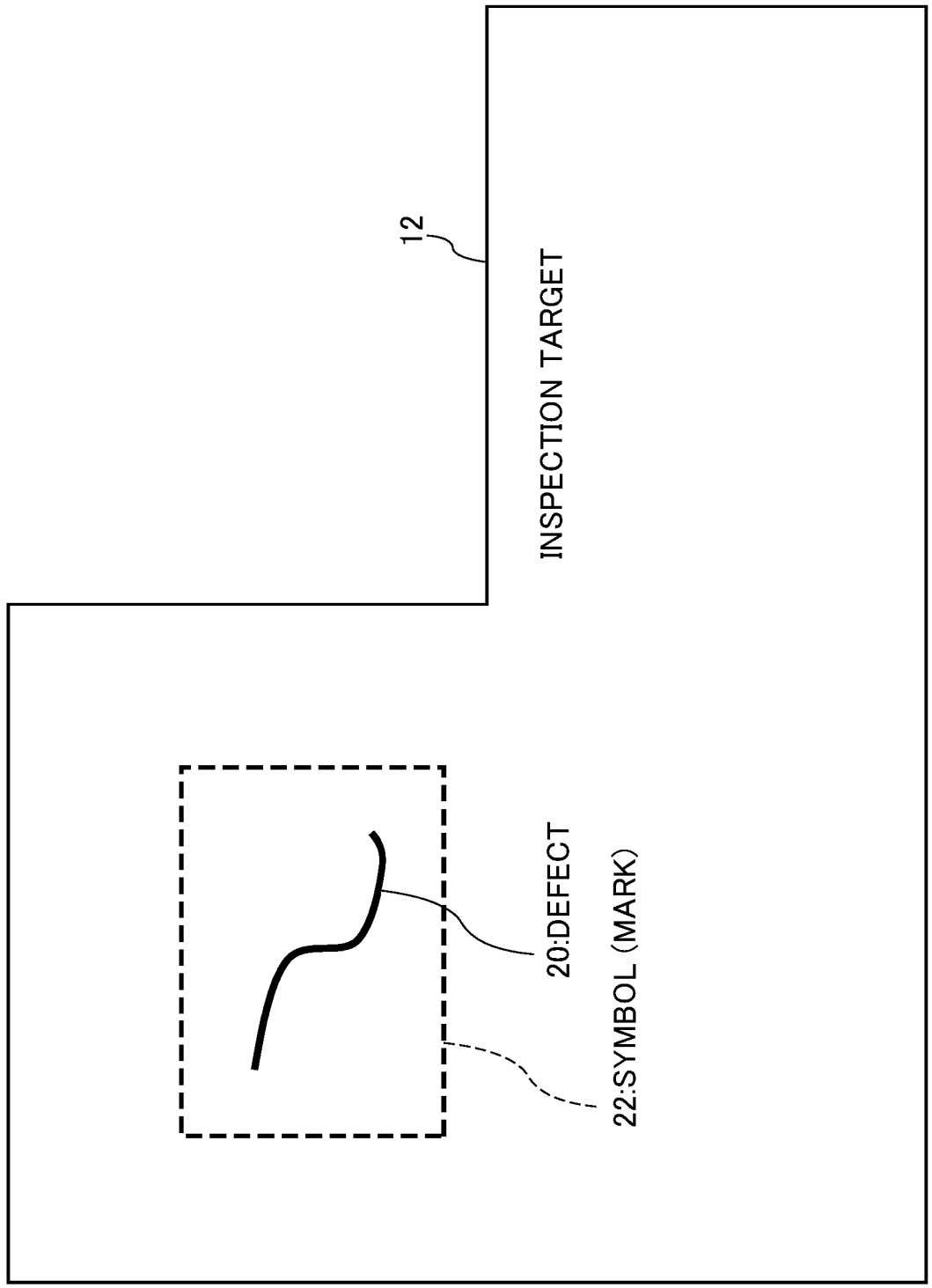
FIG. 4 is an explanatory drawing showing an aspect of marking a symbol 22 on the inspection target 12.

In Step S3-2, if finding a defect, the inspector performs marking at this defect site. An aspect of this marking is shown in FIG. 4. The marking is performed by attaching a predetermined symbol (mark) 22 for indicating the site of the defect 20 on the inspection target 12 to this site (marking). As shown in FIG. 4, the inspector inspects visually the surface of the inspection target 12, and attaches (marks) the symbol 22 to the inspection target 12 so as to indicate the site of the defect 20 found. The symbol 22 is a mark literally indicating the site of the defect 20, and the marking is performed by painting a predetermined paint so as to surround the defect 20. A rectangle may be drawn, or a circle may be drawn with a predetermined color pen, for example. Other than a pen, it is possible to use various means such as a stamp, writing brush, paint brush, or spray. In addition, although "paint" is stated above, it is possible to use various pigments, dyes, etc. In addition, a fluorescent paint may be used such that is a transparent paint by visual light, but reacts to UV light to emit a predetermined fluorescence. If using such a paint, since it is not possible to recognize the symbol 22 being attached by the naked eye normally, it is possible to recognize the presence/absence of a defect without harming the external appearance of the inspection target 12. In addition, a paint containing other fluorescent material that reacts with light of another wavelength may be used.

In FIG. 4, although the symbol 22 is expressed by a dotted line for convenience of explanation, a predetermined color may be given so as to surround the defect 20 on the surface of the inspection target 12 by a predetermined color pen. It is possible to employ a predetermined color as the symbol 22 in this way. In addition, a predetermined shape may be employed as the symbol 22. For example, it is possible to employ various shapes such as the graphic of a rectangle, or a star shape. The defect 20 may be surrounded by the graphic of a rectangle, or a star shape may be drawn on the site of the defect 20. So long as being a color and/or shape whereby it is easy to distinguish in the image, any color/shape may be used as the symbol 22.

In addition, the type of symbol 22 marking may be changed according to the type of defect. For example, the shape of the symbol 22 may be changed according to the type of defect. Various shapes such as a circle, square, triangle or star shape may be utilized. In addition, materials having different reflective optical wavelengths may be utilized as the symbol 22. In the case of using a material that tends to reflect infrared light, or case of using a material that tends to reflect ultraviolet light, the symbol 22 may be configured by coating various materials having mutually different reflective light spectra on the inspection target 12.

In one of the examples of different reflective optical wavelengths, it has been considered to use paints of different colors. For example, the color of the symbol 22 marking may be changed according to the type such as "scratch", "stain" or "chip". For example, in the case of a scratch, it is painted red, and in the case of a stain, it is painted blue. The color may be changed such as painting green in the case of a chip. By including various information of the defect obtained from the marking in the training data, it becomes possible for the learning unit to judge the type of defect. It should be noted that, although an example of an inspector performing marking in Step S3-2 is explained, it may be executed by a robot. In addition, in the inspection step of the manufacturing process, the inspector and/or inspection robot may execute.

Figure 5:
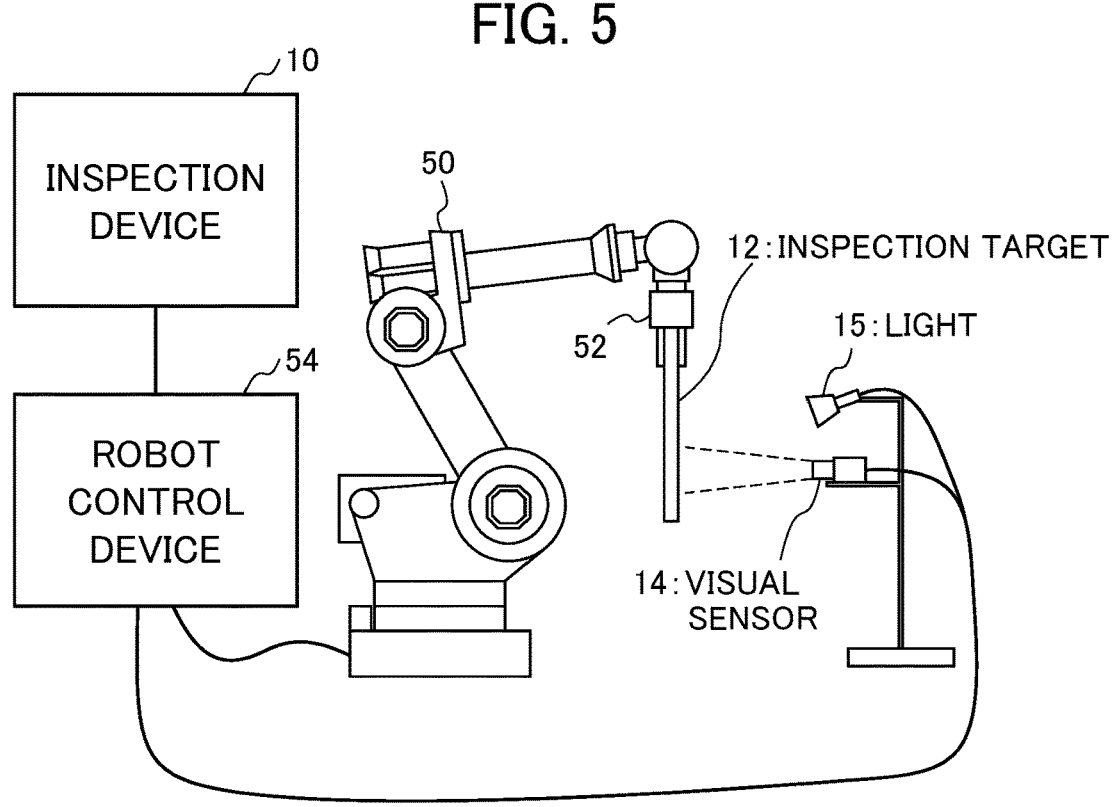
FIG. 5 is an explanatory drawing for a case of configuring so that a robot 50 grips the inspection target 12 using a hand 52 thereof, and the positional posture of the inspection target 12 is not changed.

In Step S3-3, the inspector installed the inspection target 12 in the field of vision of the visual sensor 14. Then, the visual sensor 14 is controlled to perform capturing of a defect location. This aspect is as explained with FIG. 1, for example. It should be noted that, as shown in FIG. 5, it may be configured so that the robot 50 grips the inspection target 12 using the hand 52 thereof, so as not to change the positional posture of the inspection target 12. In this case, the inspection device 10 can control the inspection target 12 to a desired positional posture by controlling the robot 50 and hand 52 thereof using a robot control device 54. In addition, since moving the inspection target 12 in the example shown in FIG. 5, it shows an example in which the positional posture of the visual sensor 14 is fixed, and the light 15 is also fixed.

Figure 6:
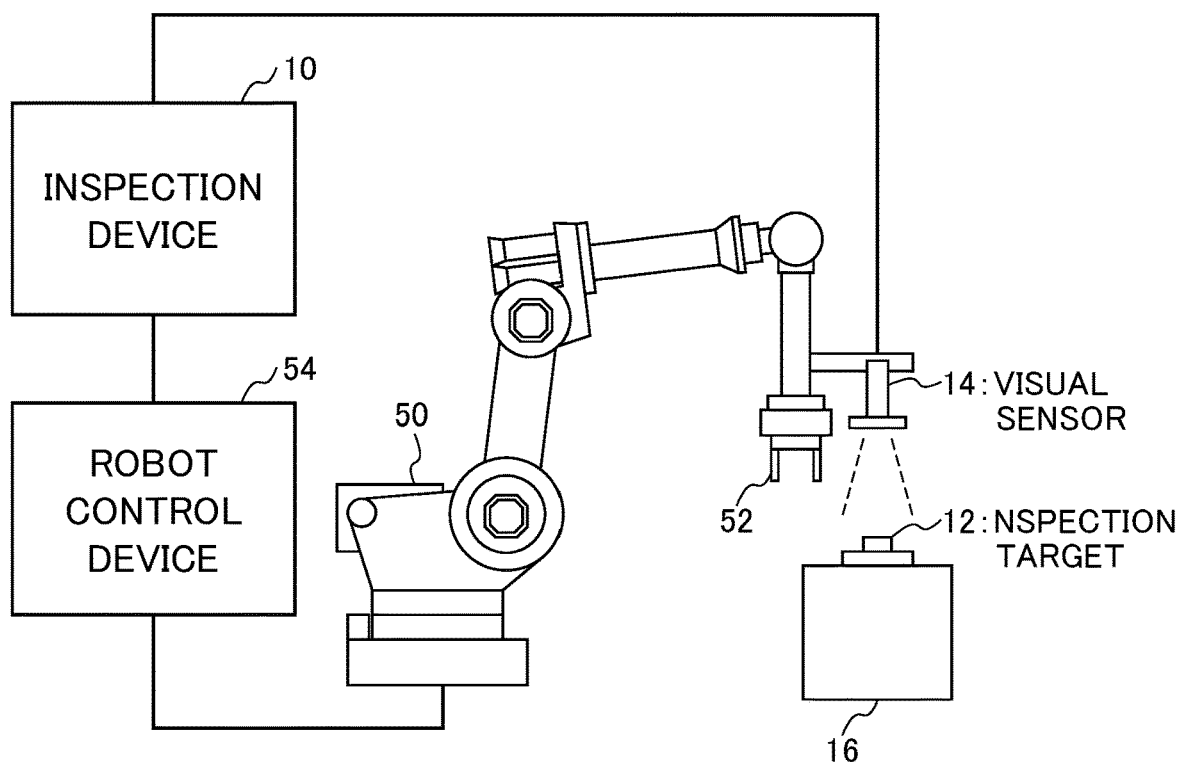
FIG. 6 is an explanatory drawing for a case of configuring so as to install a visual sensor 14 at a leading end of an arm (or hand 52) of the robot 50 and the positional posture of the visual sensor 14 does not change.

In this example of FIG. 5, in the case of capturing an arbitrary inspection location of the inspection target 12, the robot 50 will grip and cause the inspection target 12 to move. As a result thereof, it is possible to perform capturing of each inspection location of the inspection target 12. In addition, as shown in FIG. 6, it may be configured so that the visual sensor 14 is installed to the leading end of the arm (or hand 52) of the robot 50, so that the positional posture of the visual sensor 14 is not changed. Then, capturing of the inspection target 12 is performed in the same way as when doing inspection. In this case, the inspection device 10 can control the visual sensor 14 to the desired positional posture by controlling the robot 50 and hand 52 thereof using the robot control device 54. In addition, since moving the side of the visual sensor 14 in the example shown in FIG. 6, the positional posture of the inspection target 12 is fixed, and the inspection target 12 is placed on the work bench 16 similarly to FIG. 1. In this example of FIG. 6, in the case of capturing an arbitrary inspection location on the inspection target 12, the robot 50 causes the visual sensor 14 on the hand 52 thereof to move over the surface of the inspection target 12, and performs capturing at each inspection location of the inspection target 12.

By configuring in this way, capturing is performed similarly to during inspection by the visual sensor 14 in Step S3-3; however, an explanatory drawing of an image 24 upon performing this capturing is shown in FIG. 7. An example of a case in which the symbol (mark) 22 being included in the image 24 obtained by capturing is FIG. 7. FIG. 7 shows an example for a case of the symbol (mark) 22 being included in the image 24 obtained by capturing; however, in the case of there not being a defect, the symbol (mark) is not expressed in the image 24 obtained by capturing. In addition, according to the configuration of FIG. 5 or 6, it is possible to perform capturing of a plurality of inspection locations by moving either of the inspection target 12 or the visual sensor 14. An aspect for the case of capturing a plurality of images is shown in FIG. 8. The example of FIG. 8 shows an aspect of the four images of images 24a, 24b, 24c and 24d being captured while overlapping. In FIG. 5, output data of the visual sensor 14 is connected to the inspection device 10 via the robot control device 54. In addition, in FIG. 6, the output data of the visual sensor 14 is connected to a direct inspection device. By configuring in this way, the image captured by the visual sensor 14 is supplied to the inspection device 10, and the machine learning device 40 (creation unit 44 thereof) within the inspection device 10 performs processing. The details of this processing will be explained in the next Step S3-4.

In Step S3-4, the symbol (mark) 22 is detected from the captured image, and if the symbol 22 is present, the label of NG will be associated with this image. For example, in the case of the image 24a in FIG. 8, since the symbol 22 is present, the label of NG is associated. In addition, in the case of there not being a symbol as in the image 24d in FIG. 8, for example, the label of OK is associated with this image. Furthermore, information such as the position and/or size of the defect may be associated with this image. By configuring in this way, the training data for machine learning is created. The training data is data at least including images (e.g., the aforementioned images 24a, 24b, 24c, 24d), and labels associated with these images (retaining a value of OK or NG). This training data may include a variety of information of defects. It may include a variety of information such as the type of defect, in addition to the aforementioned position and size of defect. The above-mentioned image constituting this training data is a training image. Herein, the image captured and inputted itself is used as is as the training image. In this way, the image generated based on the inputted image may be used as the training image. Image generated based on the inputted image has the meaning of including the inputted image itself, and additionally, includes an image on which various image processing had been conducted such as the removal, trimming and enlarging of the symbol 22, for example.

As mentioned above, in the case of the symbol being changed and marked according to the type of defect, the type of defect according thereto may be included as training data. The above-mentioned processing in this Step S3-4 is executed by the machine learning device 40 (creation unit 44 thereof) within the inspection device 10. More specifically, the machine learning device 40 inputs the image captured by the visual sensor 14 via the image input unit 42. The image input unit 42 can utilize an external input interface of a computer or the like, for example. The learning unit 46 of this machine learning device 40 performs learning based on the training data in the storage unit 33, and performs determination of whether or not there is a defect on the inputted image, based on the learning results thereof (learning model). The characteristic matter in the machine learning device 40 of the present embodiment is the matter of including an operation mode that creates training data itself based on the given images, and performs learning based on this. Therefore, compared to the conventional case of a person creating the training data, it is possible to reduce human labor.

The conventional machine learning device 40 includes the two types of operation modes of a learning mode that provides training data (for example, images and labels), and performs learning based thereon, and a determination mode that performs predetermined determination also for images based on the results from learning. In contrast, in addition to the above-mentioned two types of modes, the machine learning device 40 of the present embodiment has a third operation mode which is a learning data creation mode of inputting an image group including marked images, and creating training data. In this third training data creation mode, the creation unit 44 executes the aforementioned processing of Step S3-4, and creates the training data. Although the created training data may be stored in the storage unit 33 as is, the processing of Step S3-5 explained next may be conducted thereon, and then stored in the storage unit 33.

In Step S3-5, the creation unit 44 of the machine learning device 40, in the case of the symbol 22 being attached to the image, may remove the symbol 22 by a predetermined means from this image. Although also depending on the type of symbol 22, when executing learning by using the image marked by the symbol 22 as the training data as is, the possibility is high of learning the target to which the symbol 22 is attached as NG. As a result thereof, an image to which the symbol 22 is not attached may be misjudged. In other words, at the actual stage of inspection, since the symbol 22 is not marked on the inspection target 12, an image that is not marked should be learned as training data. Therefore, in the case of the symbol 22 being in the image, it is desirable to utilize an image made by removing the symbol 22 from this image (=symbol 22 not captured) as the training image included in the training data. Such removal of the symbol 22 can be executed by the creation unit 44 of the machine learning device 40.

In Step S3-6, the creation unit 44 of the machine learning device 40 utilizes this image as a training image, and as training data together with the label associated with this image. In other words, the pair of a label and training image is added to the existing training data. The added training image and label thereof are stored in the storage unit 33. In addition, when capturing a plurality of inspection locations, a plurality of pairs of training data will be added.

(Machine Learning)

Then, in the case of a sufficient number of pairs of training images and labels for learning (training data) having been created, it is possible to perform learning with the training image as the input and the label as teaching data. The machine learning device 40, due to being a device that literally performs machine learning, can execute learning similarly to as conventionally. The configuration of the machine learning device 40 has already been shown in FIG. 2. The learning unit 46 having progressed to an extent that there is already learning may be made to do sequential learning. In the present embodiment, if the learning of the learning unit 36 has completed, it is possible to use the learning unit 46 in inspection. In other words, after learning (learning mode) has ended, it is possible to use in the aforementioned determination mode.

The inspection device 10 of the present embodiment, using the learning unit 46 which has done learning, can cause this learning unit 46 to perform judgment of OK (no defect)/NG (has defect) when inputting a new image (image captured in inspection) via the image input unit 42. In addition, it is also possible to make operate such as obtain the probability of being a defect, and obtain the defect position. This is because, depending on what is used as the teaching data (label) in learning, what to output will also change. In the aforementioned example, although an example using OK/NG as labels is explained, in this case, the learning unit 46 outputs OK/NG. As the teaching data, if using the probability of being a defect, or position of a defect, the learning unit 46 will output the probability of being a defect or position of the defect. It should be noted that the learning model that is the result of learning may be shared by the learning unit 46 of another machine learning device 40. In other words, the learning unit 46 made to perform learning is only one device, and the result of learning may be appropriated and shared as is with another machine learning device 40.

(Removal of Symbol (Mark))

The aforementioned example of FIG. 3 explains an example of removing the symbol 22 (mark) in Step S3-5; however, various methods for removing the symbol 22 exist. Methods of removing the symbol 22 from an image will be explained below.

(Method 1)

In the case of being marked by painting a rectangle as in FIG. 4, it is possible to establish a learning image by cutting out only the inside of the symbol 22. This aspect is shown in FIG. 9. This processing is processing executed in Step S3-5 by the aforementioned creation unit 44. The matter of selecting a region surrounded by a certain border (herein the symbol 22) so as not to include this border (symbol 22) is known as one type of image processing; therefore, it is sufficient for the creation unit 44 to perform such image processing to create the training image.

(Method 2)

It is possible to establish an image made by replacing pixels constituting a portion of the symbol 22 using information of the peripheral pixels thereof (replacement with peripheral pixels) as the training image. This aspect is shown in FIG. 10. This processing is processing executed by the aforementioned creation unit 44 in Step S3-5. The matter of eliminating by replacing a certain border (herein the symbol 22) with the peripheral pixels of this border is known as one type of image processing; therefore, it is sufficient for the creation unit 44 performs such image processing to create a training image. Whether or not being a region of the symbol 22 can be distinguished from the shape, color or the like thereof.

(Method 3)

Figure 11A:
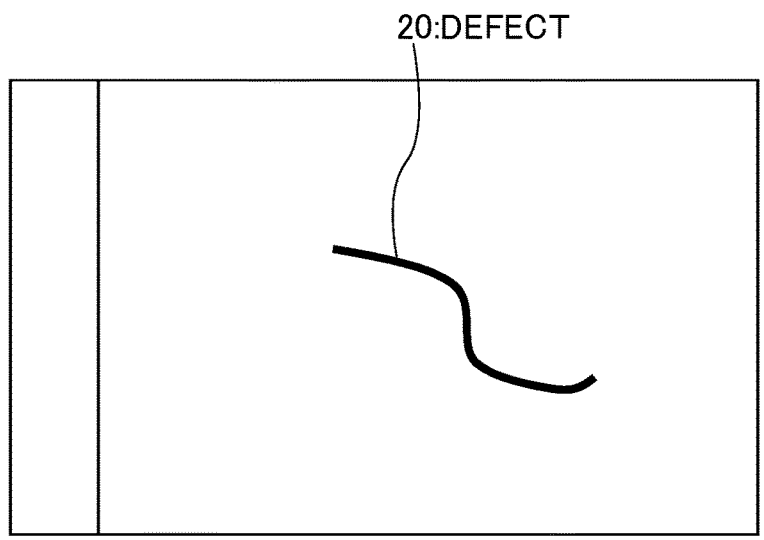
FIG. 11A is an explanatory drawing showing an aspect of an image captured by visible light illumination, and only a defect 20 being reflected.
Figure 11B:
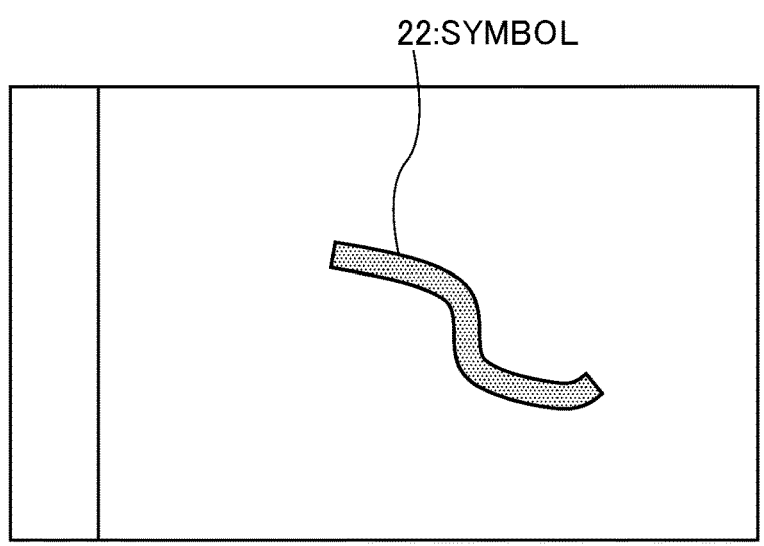
FIG. 11B is an explanatory drawing showing an aspect of an image captured by only ultra-violet light illumination, and only a symbol 22 being reflected.

It is possible to mark with special paint that is only visible when hit with light of a specific wavelength. Herein, an example is explained of marking using a paint that is visible only when hit with ultraviolet rays (fluorescence is emitted). An example is explained in which this paint is transparent in terms of visual light, and is a paint that is not visible (transparent) under natural light. The ultraviolet rays in the present embodiment are a preferred example of light of a wavelength at which the symbol 22 can be seen in the claims; however, if another type of paint, light of another wavelength may be used. The visible light in the present embodiment is a preferred example of light of a wavelength at which the symbol 22 cannot be seen in the claims; however, if another type of paint, light of another wavelength may be used. In this case, when capturing an image, capturing is performed by hitting with visual light, and capturing is performed next by hitting with ultraviolet light. In the case of capturing with visual light, an image in which only a defect is reflected will thereby be obtained as in FIG. 11A. On the other hand, in the case of capturing with only ultraviolet light, an image in which only the symbol 22 is reflected will be obtained as in FIG. 11B. Herein, it is assumed that the inspection target 12 is a target without a site such that luminesces to ultraviolet rays. Therefore, the detection of the symbol 22 can be performed by the image (FIG. 11B) hit with ultraviolet light, and the image (FIG. 11A) hit with visual light can be utilized as a training image. Such processing may be executed by a person adjusting the light 15 manually. The inspection device 10 may control the light 15 and capture each image in order. If able to adopt such a method, it will be possible to mark by superimposing the symbol 22 over the defect 20, and possible to more reliably express (realize) information such as the position and shape of the defect, as shown in FIG. 12. In FIG. 12, the symbol 22 is marked to overlap the defect 20.

(Method 4)

Figure 13A:
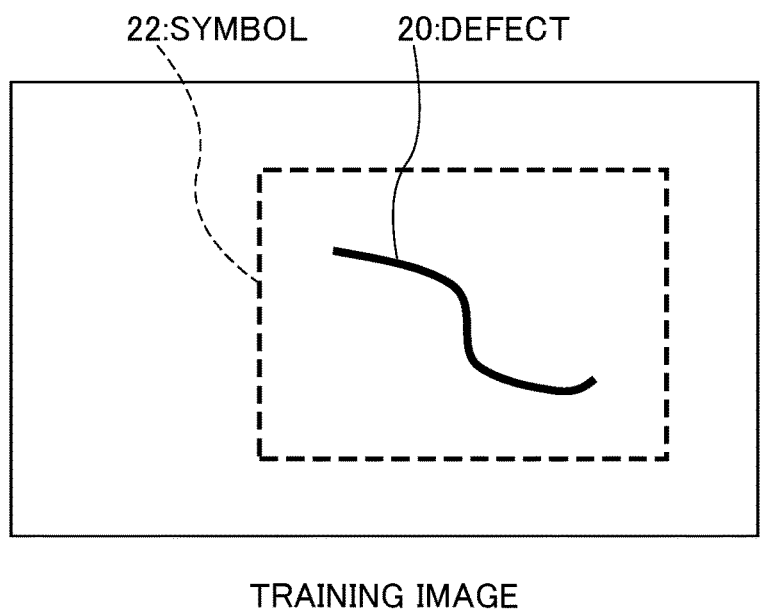
FIG. 13A is an explanatory drawing showing an example of leaving the symbol 22 as is and using as a training image.
Figure 13B:
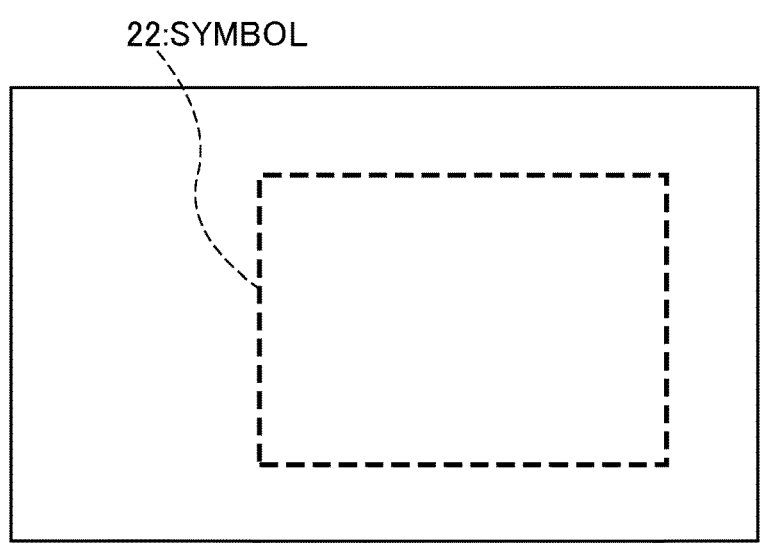
FIG. 13B is an explanatory drawing showing an example of a mask image defining only pixel values of a portion of the symbol 22 as 1, and other pixel values as 0.

In Step S3-5 explained in FIG. 3, although the training image is created by removing the symbol 22, a method has also been considered that takes into account that the symbol 22 is present during learning, without removing the symbol 22 from the learning image. First, the image leaving as is the symbol 22 is used as the training image. An example of such a training image is shown in FIG. 13A. Since the presence of the symbol 22 is conferred to the learning unit 36, a mask image including only the symbol 22 is created. When detecting the symbol 22 from the image, a mask image defining only pixel values of the portion of the symbol 22 as 1, and defining other pixel values as 0 is created. Such a mask image is shown in FIG. 13B. During learning, the learning unit 46 can learn by taking into account the presence of the symbol 22, by also inputting a mask image (FIG. 13B) to the learning unit 46 along with the training image (FIG. 13A). In the case of configuring in this way, it is necessary to attach the symbol 22 also to the detection target 12 without a defect, and input data with the label of OK to the learning unit 46. By configuring in this way, it is possible to make so as not to immediately determine as NG, even if the symbol 22 is attached.

It should be noted that points of difference between Patent Document 2 and the present embodiment will be explained. In the present embodiment, the location at which attaching the symbol 22 is used in the specification of the defect site of the training image, as mentioned above. In contrast, Patent Document 2 does not disclose the matter of marking the symbol 22 for such a training image. In addition, in the present embodiment, there is also a case of executing processing such that removes the location attaching the symbols 22 from the image, as mentioned above. However, such image processing for removing such a symbol 22 portion is not disclosed in Patent Document 2.

Although embodiments of the present invention have been explained in detail above, the aforementioned embodiments are merely showing specific examples upon realizing the present invention. The technical scope of the present invention is not to be limited to the embodiments. For the present invention, various modifications are possible within a scope not departing from the gist thereof, and these are also encompassed in the technical scope of the present invention.

EXPLANATION OF REFERENCE NUMERALS 10 inspection device
12 inspection target
14 visual sensor
15 light
16 work bench
20 defect
22 symbol (mark)
24 image
33 storage unit
40 machine learning device
42 image input unit
44 creation unit
46 learning unit
50 robot
52 hand
54 robot control device

What is claimed is:

1. A machine learning device for creating training data to be used in machine learning, the machine learning device comprising:
an image input unit that inputs an image which was obtained by capturing an inspection target on which a symbol indicating a defect may be marked; and
a creation unit that creates the training data based on the inputted image,
wherein the creation unit:
creates training data consisting of a training image which is the image as inputted, and a label that retains a value of OK which signifies not having a defect, in a case of there not being the symbol in the image inputted; and
creates training data consisting of a training image generated based on the image inputted, and a label that retains a value of NG signifying having a defect, in a case of there being the symbol in the image inputted.

2. The machine learning device according to claim 1, wherein the creation unit creates training data consisting of a training image generated based on the image inputted, a position of a defect indicated by the symbol, and a label retaining the value of NG, in a case of there being the symbol in the image inputted.

3. The machine learning device according to claim 1, wherein the symbol indicating the defect is a different symbol depending on a type of the defect, and
wherein the creation unit creates training data consisting of a training image generated based on the image inputted, a type of defect indicated by the symbol, and a label retaining the value of NG, in a case of there being the symbol in the image inputted.

4. The machine learning device according to claim 3, wherein a scratch, stain and chip of the inspection target are included as types of the defect.

5. The machine learning device according to claim 3, wherein the different symbol is a symbol having a different reflective optical wavelength from another symbol.

6. The machine learning device according to claim 1, wherein the creation unit:
generates a training image by removing the symbol from an image generated based on the image inputted, in a case of there being the symbol in the image inputted, and
creates training data consisting of the training image thus generated, and a label retaining the value of NG.

7. The machine learning device according to claim 6, wherein the creation unit generates a training image by cutting out only inside of a region indicated by the symbol from the image inputted, in a case of there being the symbol in the image inputted.

8. The machine learning device according to claim 6, wherein the creation unit generates a training image by replacing pixels constituting the symbol from the image inputted with peripheral pixels of the symbol, in a case of there being the symbol in the image inputted.

9. The machine learning device according to claim 1, wherein the creation unit creates training data consisting of a training image generated based on the image inputted, a label retaining a value of NG signifying having a defect, and a mask image that masks the symbol, in a case of there being the symbol in the image inputted.

10. The machine learning device according to claim 9, wherein the mask image is an image setting pixels constituting the symbol as 1, and setting pixels other than the symbol as 0.

11. The machine learning device according to claim 1, wherein the image input unit inputs a marking image obtained by capturing an inspection target on which a symbol indicating a defect is marked in a state illuminating with light of a wavelength whereby the symbol is visible, and a training image obtained by capturing in a state illuminating with light of a wavelength whereby the symbol is not visible, and
wherein the creation unit creates training data consisting of information of a defect acquired from the marking image, and the training image.

12. An inspection device comprising:
the machine learning device according to claim 1; and
a storage unit that stores training data created by the machine learning device,
wherein the machine learning device includes a learning unit which learned from training data stored by the storage unit, and outputs a determination result of a defect based on an image of the inspection target inputted by the image input unit.

13. An inspection device comprising:
the machine learning device according to claim 11; and
a storage unit that stores training data created by the machine learning device,
wherein the image input unit inputs an image obtained by capturing in a state illuminating with light of a wavelength whereby the symbol indicating a defect is not visible, and
wherein the machine learning device includes a learning unit which learned from training data stored by the storage unit, and outputs a determination result of a defect based on an image of the inspection target inputted by the image input unit.

14. A machine learning method for creating training data to be used in machine learning, the method comprising the steps of:
inspecting an inspection target, and when a defect is found, marking a symbol on a defect location;
inputting an image obtained by capturing the inspection target; and
creating the training data based on the image inputted,
wherein the step of creating the training data includes:
a step of creating training data consisting of a training image which is the image as inputted, and a label that retains a value of OK signifying not having a defect, in a case of there not being the symbol in the image inputted; and
a step of creating training data consisting of a training image generated based on the image inputted, and a label that retains a value of NG signifying having a defect, in a case of there being the symbol in the image inputted.

* * * * *